United States Patent Office 3,824,171
Patented July 16, 1974

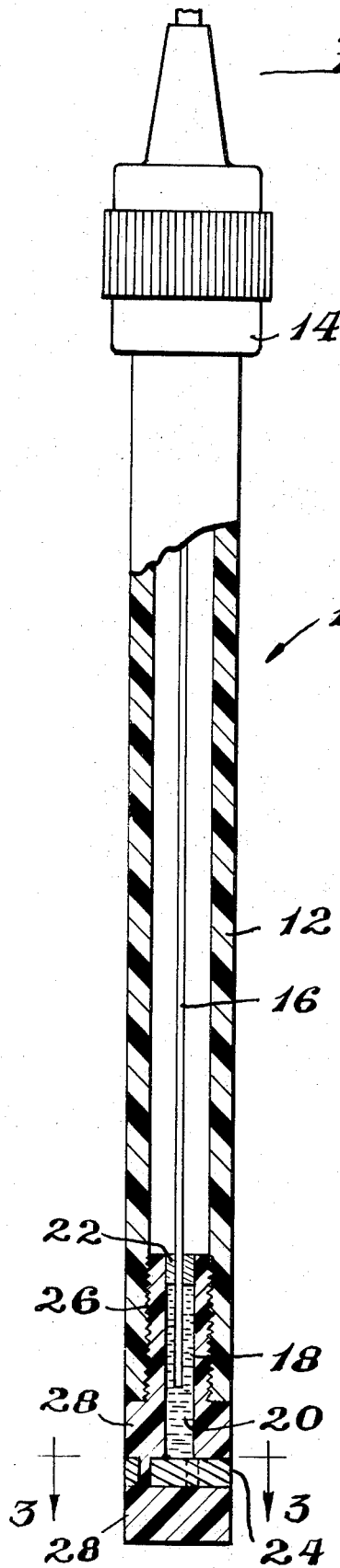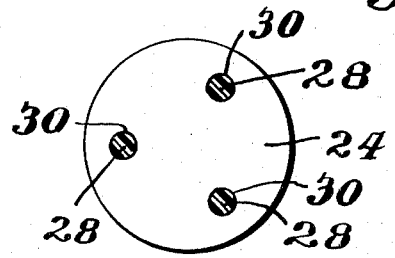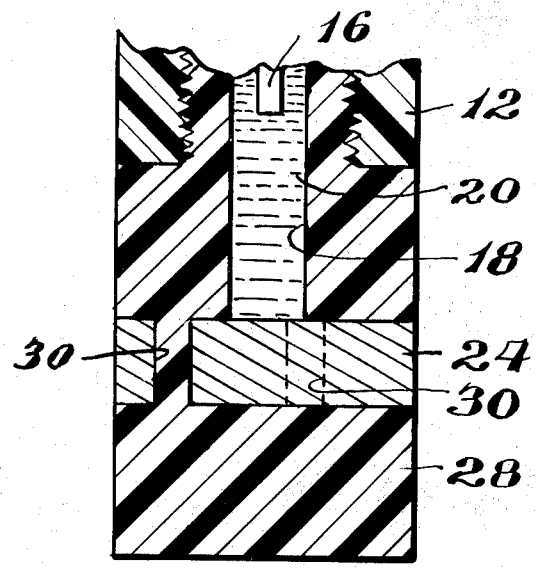

3,824,171
NOVEL ELECTROCHEMICAL ELECTRODE ASSEMBLY
Jan van Houwelingen, Leersum, Gerardus Wouter Serge van Osch, Utrecht, and Anton Maarten Herman Weelink, Lichtenvoorde, Netherlands, assignors to Control Data Corporation, Minneapolis, Minn.
Filed Jan. 15, 1973, Ser. No. 323,698
Int. Cl. G01n 27/46
U.S. Cl. 204—195 M
18 Clams

ABSTRACT OF THE DISCLOSURE

An ion-sensitive electrode assembly is disclosed having a tubular body of an insulating material, a cavity within the body containing a reference electrolyte, an electrically conductive reference electrode partially contained in the cavity and in electrochemical communication with the electrolyte and a compressed, substantially impervious pellet of an ion-sensitive material embedded in the body to a solution of ions to be measured and another surface in contact with the electrolyte.

Preferred is a pellet arrangement containing several holes in the pellet securing the pellet on one end to the body and providing a protective, dielectric barrier on the other. The electrode provides for improved contact with the solutions of ions to be measured, is easy to clean and is well adapted to withstand mechanical shock.

BACKGROUND OF THE INVENTION

This invention relates to electrode structures for determining and measuring the presence of ions in solutions.

Measurement of the concentration of selected ions in solution, for example, the dissolved fluorides in drinking water, has been described and apparatus proposed in a number of U.S. patents including 3,442,782 in the name of Shiller et al., 3,431,182 in the name of Frant, 3,591,464 in the name of Frant et al. and 3,563,874 in the name of Ross et al. Common to the type of ion measuring apparatus described there is an ion-sensitive membrane or sheet of material contained within an electrode assembly, the membrane being exposed on one surface to the solution of ions to be measured and on the other surface to a reference electrolyte solution. The phenomenon occurring when such an electrode is contacted with the solution of selected ions to be measured is an electrical potential across the membrane that is contact with the two ionic solutions according to the Nernst equation. This potential is detected and transmitted to measurement apparatus which is typically a high input impedance voltmeter. The voltmeter is also connected to a standard reference electrode and it too is immersed in the solution of ions to be measured. Standard reference electrodes are well known and usually comprise a glass shell that contains a silver-silver chloride electrode in a saturated potassium chloride-silver chloride solution separated by a ceramic junction from the solution to be measured.

The ion-sensitive electrode, particularly of the type having a sensitive membrane made from a highly compressed powder which, prior to compression, is usually water-insoluble prior to compression as it is composed of one or more water-insoluble salts. The pressure used to compress and consolidate the powders is substantial and is such that an imporous solid sheet or membrane results. The term membrane is used herein in agreement with its art-recognized meaning in potentiometric electrode technology and embraces a sheet-like structure, generally regardless of its flexibility or curvature, which primarily provides a pair of surfaces between which ionic charge transfer is effected.

Prior structures have included a hollow tubular container of a dielectric material containing an electrolyte solution sealed at one end with a barrier disk or membrane, for example, secured to one end of the tubular container with a sealing compound. Another structure holds a sheet-like circular membrane press fit against the end of the tubular structure separated by an intermediate O-ring held in place by a threaded annular flange. Such devices are illustrated in FIG. 1 of U.S. Pat. 3,591,464, mentioned above. Common to this type of structure is a flat, sheet-like disk-shaped membrane of a thickness of one-quarter of an inch or preferably even less. With such a structure the mechanical strength of the membrane is a limiting factor in the day to day use of the electrode.

A solution to the mechanical handling problem has been proposed in U.S. Pat. 3,563,874, mentioned above, and this includes coprecipitating the silver salts of silver sulfide and silver chloride and compressing the coprecipitate under vacuum conditions to form an imporous, dense pellet. However, it has been found that even with high pressures, the disk-shaped membranes do not have the requisite mechanical strength for rugged day-to-day handling.

Other disadvantages of ion-sensitive electrodes of the known structures include fouling of the flat plate or disk when abrasive or particulate solutions are analyzed. Cleaning the electrode after use may sometimes be difficult, particularly in equipment where the electrode is recessed in from the tip of the probe as with the O-ring assemblies. In some situations, it is desirable to increase the surface area of the membrane, for example, in measuring solutions having low ion concentrations. Inherently the surface area of the disk-shaped membrane is limited by the degree density and imporosity that can be achieved with high compression for the finely divided matrix materials selected.

We have now discovered a novel ion-sensitive electrode structure wherein the ion-sensitive material is embedded in a body of electrically insulating material having one surface exposed to the solution of ions to be measured and another surface in communication with the reference electrolyte solution. The novel structure described herein allows for better contact between the solutions of ions to be measured as the thickness of the sensitive element may be increased as desired. Also the circular or oval surface is not flat avoiding the accumulation of particles on the surface as occurred in prior arrangement. The electrode assembly disclosed here is also easily cleaned.

DETAILED DESCRIPTION OF THE INVENTION

FIG. 1 is a side-elevational, partially cross-sectional view of an electrode embodying the principles of the present invention;

FIG. 2 is an enlarged side-elevational, cross-sectional view of the lower portion of FIG. 1; and FIG. 3 is a downward cross-sectional plan view taken along lines 3—3 of FIG. 1.

Referring now to FIG. 1, there is illustrated one embodiment of the present invention wherein the electrode structure is in the form of a probe to be inserted into a solution of ions to be measured. The electrode assembly 10 has an outer wall or body 12 made from an insulating material that is inert to and is not corroded by either the solution in which the electrode is embedded or the electrolyte solution that may be contained therein. Suitable dielectric materials include polyvinylchloride, polytetrafluoroethylene, ABS rubber, glass and epoxy resin. The upper end of body 12 is covered with a cap or closure 14 secured to the body 12 by cement, threads or the like. An electrically conductive reference electrode 16 extends through the cap in a sealing fashion and extends at least partially into cavity 18 and into the electrolyte solution 20 contained therein. Usually the electrode is a wire of silver or platinum that is optionally coated on the lower end thereof extending into the electrolyte with a salt of the corresponding metal such as silver chloride when silver is used. Optionally a metal wire may be used that is coated on its outside surface with silver or platinum.

Wire 16 extends into cavity 18 which is sealed by an insulating sealing means that prevents the electrolyte from leaving the cavity 18. Cavity 18 is defined by walls on either side, seal 22 at the top and pellet 24 at the bottom and is preferably coaxial with body 12 when it is tubular. In the embodiment shown the cavity assembly containing pellet 24 is secured to body 12 by threads 26. It will be appreciated, however, that cement or other securing means may be employed.

The novel pellet structure is more clearly shown in FIG. 2 where an insulating barrier 28 is provided on either side of pellet 24. Holes 30 are provided in pellet 24 offset from the cavity 18 and the holes are filled with the insulating material 28, thereby securely joining one portion of barrier 28 to the other. Barrier 28 is of an imporous insulating material such as the material from which the body 12 is fabricated; the barrier used need not be of the same material as the body 12. Holes 30 in pellet 24 filled with barrier material 28 are shown in more detail in FIG. 3. Pellet 24 secured by barrier 28 is positioned so that a surface is in fluid and electrical contact with the electrolyte 20 and another surface of the pellet 24 is exposed to the solution of ions to be measured.

Received in the cavity 18 is an electrolyte solution 20 which is usually an aqueous solution containing fixed ion levels. For example, the electrolyte may comprise a 0.1M aqueous solution of potassium chloride saturated with silver chloride. Other electrolyte materials, depending on the nature of the pellet, will be apparent to one skilled in the art.

Referrring now to electrode 10, in most applications the electrode will be connected through a coaxial cable (not shown) to a high impedance voltmeter (also not shown), the central cable conductor connected to the reference electrode while the peripheral or outside conductor which is optional provides an electrostatic shield.

In operation, when the electrode assembly 10 is immersed in a solution of ions to be measured, through pellet 24 an electrical potential of the Nernstian type is created and is transmitted by electrode 16 to a high impedance voltmeter for detection and measurement.

Pellet 24 as described herein consists of a compressed intimate mixture of two or more compounds. One compound is the electroconductive matrix material and the other compound or compounds contain the species of ions sought to be detected. As indicated, elements of this general type are already known, for example the compressed mixture of silver sulfide with cupric sulfide, lead sulfide, cadmium sulfide or silver cyanide and are disclosed in U.S. Pat. 3,591,464, the disclosure of which is hereby incorporated by reference. Other pellet materials and mixtures of materials that are suitable are also known in the art although usually characterized as a relatively thin sheet or membrane.

While the above pellet materials may be used, we prefer to use the ion selective electrode materials described in our copending applications entitled "Ion Selective Electrode Comprising Cuprous Sulfide" in the name of Weelink et al., under Ser. No. 323,697 filed Jan. 15, 1973, and "Ion Selective Electrode Comprising Gold" in the name of Van Osch et al., under Ser. No. 323,696, also filed on Jan. 15, 1973, concurrently herewith; the disclosure of both of said applications is incorporated herein by reference.

According to one preferred embodiment, an electrode assembly for selectively measuring ions in solution is provided having an ion selective substantially imporous pellet compressed from an intimate and substantially uniform mixture of cuprous sulfide, as the electroconductive matrix, and a compound selected according to the species of ions for which the electrode is to be sensitive. Both the cuprous sulfide and the other compound selected are used in a finely divided state. The compound or salt that is selected depends upon the response desired by the electrode and the ion in solution to which the element is to be responsive. For example, if the electrode is to be used for measuring chloride ions, then the salt selected is silver chloride. On the other hand, silver bromide would be used for measuring bromine ions. Similarly, silver iodide is used for measuring solutions of iodide ions, silver sulfide is used for measuring sulfide ions and silver ions, silver thiocyanate is used for measuring thiocyanate ions, cadmium sulfide is used for measuring cadmium ions and lead sulfide is used for measuring lead ions, cupric sulfide is used for measuring cupric ions and silver cyanide is used for measuring cyanide ions.

In another preferred embodiment the electroconductive matrix material is finely divided gold distributed throughout and mixed with an ion-sensitive compound such as silver chloride, silver bromide, silver iodide, silver cyanide, silver sulfide, silver thiocyanate, cupric sulfide, cadmium sulfide and lead sulfide.

In summary the novel electrode assembly of the present invention provides for improved contact between the ion-sensitive pellet and the material to be measured and also a variable surface area that is adjusted depending upon the thickness of the pellet employed. As the electrode assembly does not have an irregular surface, preferably it is smooth and cylindrical, particles in the solution to be measured are not attracted or retained on the electrode surface. The electrode assembly also is easy to clean.

We claim:

1. An electrochemical electrode comprising:
   a body of dielectric imporous material impervious to solution of ions to be measured;
   means defining a closed cavity within said body adapted to receive a reference electrolyte;
   an electrically conductive reference electrode extending through said body and into said cavity;
   means sealing the electrically conductive reference electrode with respect to the body where the reference electrode enters said cavity;
   a compressed, substantially impervious pellet of ion-sensitive material embedded in said body, said pellet having a pair of opposed surfaces spaced apart from each other, one of said surfaces intersecting the cavity and being adapted to contact the reference electrolyte, said pellet being adapted to be exposed at the spaced portion between the opposed surfaces for contact with the ion solution to be measured, the pellet including means defining at least one opening extending from one of said opposed surfaces to the other through said pellet, said body integrally extending through said opening;
   said body separating said reference electrode from direct contact with the ion solution to be measured.

2. The electrode as claimed in Claim 1 wherein said pellet includes a plurality of opening therein and said body integrally extends through said openings.

3. The electrode as claimed in Claim 1, wherein the other of said opposed surfaces is contacted with a portion of dielectric imporous material and the body on either side of the pellet and the pellet are of substantially the same cross-sectional shape.

4. An electrochemical electrode comprising:
   a body of dielectric imporous material impervious to a solution of ions to be measured;
   means defining a closed cavity within said body adapted to receive a reference electrolyte;
   an electrically conductive reference electrode extending through said body and into said cavity;

means sealing the electrically conductive reference electrode with respect to the body where the reference electrode enters said cavity;

a compressed, substantially impervious disk-shaped pellet of ion-sensitive material embedded in said body, said pellet having a pair of opposed surfaces spaced apart from each other and a circular surface therebetween, the pellet intersecting the cavity and exterior of the body, one of said opposed surfaces of the pellet where it intersects said cavity being adapted to contact the reference electrolyte, the circular surface of said pellet where it intersects the exterior of said body being exposed for contact with the ion solution to be measured, the other of said opposed surfaces being precluded from contact with the ion solution to be measured by a dielectric imporous material;

said body separating said reference electrode from direct contact with the ion solution to be measured.

5. The electrode as claimed in Claim 4 wherein the cross-sectional shape of said body above and below said pellet is substantially smooth.

6. The electrode as claimed in Claim 5 wherein said pellet is of substantially the same cross-sectional shape as said body.

7. The electrode as claimed in Claim 4 wherein said body is tubular.

8. The electrode as claimed in Claim 5 wherein said cavity is coaxial with said body.

9. The electrode as claimed in Claim 4 wherein said sealing means is a dielectric material different from said body.

10. The electrode as clamed in Claim 4 wherein the surface of said pellet adapted to contact said reference electrolyte forms one end of said cavity.

11. The electrode as claimed in Claim 4 wherein said body is of an insulating material selected from the group consisting of polyvinylchloride, glass, polytetrafluoroethylene and epoxy resin.

12. The electrode as claimed in Claim 4 wherein said electrically conductive reference electrode is a silver wire.

13. The electrode as claimed in Claim 4 wherein said electrically conductive reference electrode is a platinum wire.

14. The electrode as claimed in Claim 4 wherein said pellet comprises a compressed intimate mixture of cuprous sulfide and a compound sensitive to ions to be measured selected from the group consisting of silver chloride, silver bromide, silver iodide, silver cyanide, silver sulfide, silver thiocyanate, cupric sulfide, cadmium sulfide and lead sulfide.

15. The electrode as claimed in Claim 4 wherein said pellet comprises compressed intimate mixture of finely divided gold and a compound sensitive to ions to be measured selected from the group consisting of silver chloride, silver bromide, silver iodide, silver cyanide, silver sulfide, silver thiocyanate, cupric sulfide, cadmium sulfide and lead sulfide.

16. A potentiometric system for measuring the activity if ions in solution with a standard reference electrode and an ion-sensitive electrode both connected to a potential measuring device, said ion-sensitive electrode comprising:

a body of dielectric imporous material impervious to a solution of ions to be measured;

means defining a closed cavity within said body adapted to receive a reference electrolyte;

an electrically conductive reference electrode extending through said body and into said cavity;

means sealing the electrically conductive reference electrode with respect to the body where the reference electrode enters said cavity;

a compressed, substantially impervious pellet of ion-sensitive material embedded in said body, said pellet having a pair of opposed surfaces spaced apart from each other and a circular surface therebetween, the pellet intersecting the cavity and the exterior of the body, one of said opposed surfaces of the pellet where it intersects said cavity being adapted to contact the reference electrolyte, the circular surface of said pellet where it intersects the exterior of said body being exposed for contact with the ion solution to be measured, the other of said opposed surfaces being precluded from contact with the ion solution to be measured by a dielectric imporous material;

said body separating said reference electrode from direct contact with the ion solution to be measured.

17. The potentiometric system as claimed in claim 16 wherein the pellet includes means defining at least one opening extending from one of said opposed surfaces to the other through said pellet and the body integrally extends through said opening.

18. The potentiometric system as claimed in Claim 17 wherein said pellet includes a plurality of openings therein and said body integrally extends through said openings.

References Cited

UNITED STATES PATENTS

| | | | |
|---|---|---|---|
| 3,492,216 | 1/1970 | Riseman et al. | 204— 195 M |
| 3,563,874 | 2/1971 | Ross et al. | 204—195 M |
| 3,591,464 | 7/1971 | Frant et al. | 204—195 M |
| 3,607,710 | 9/1971 | Farren et al. | 204—195 M |

TA-HSUNG TUNG, Primary Examiner

U.S. Cl. X.R.

204—1T

UNITED STATES PATENT OFFICE
CERTIFICATE OF CORRECTION

Patent No. 3,824,171  Dated August 12, 1974

Inventor(s) Jan van Houwelingen, Gerardus Wouter Serge van Osch and Anton Maarten Herman Weelink It is certified that error appears in the above-identified patent and that said Letters Patent are hereby corrected as shown below:

Claim 8, line 1, for "5" read --7--

Signed and sealed this 29th day of October 1974.

(SEAL)
Attest:

McCOY M. GIBSON JR.
Attesting Officer

C. MARSHALL DANN
Commissioner of Patents